Patented Oct. 19, 1954

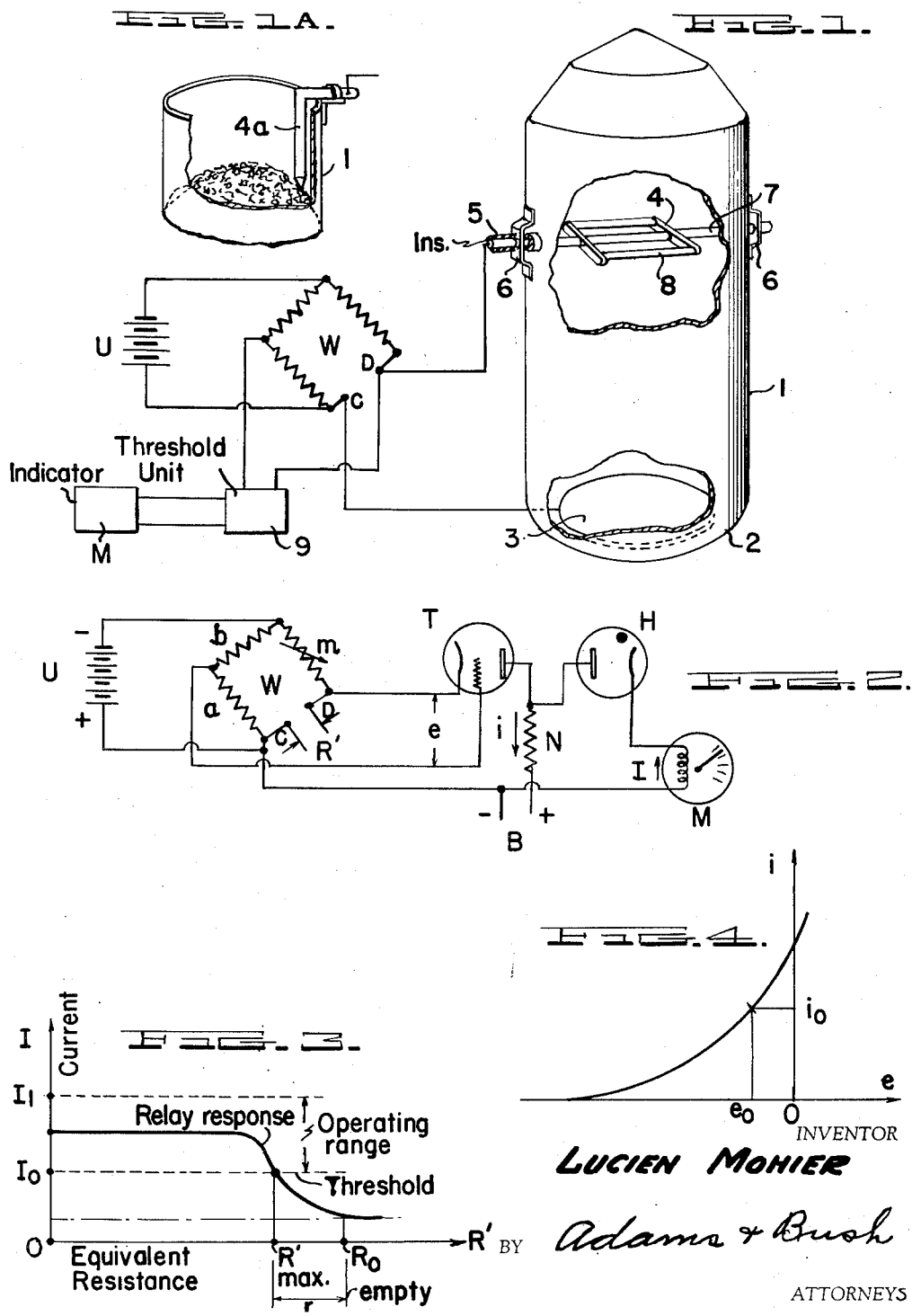

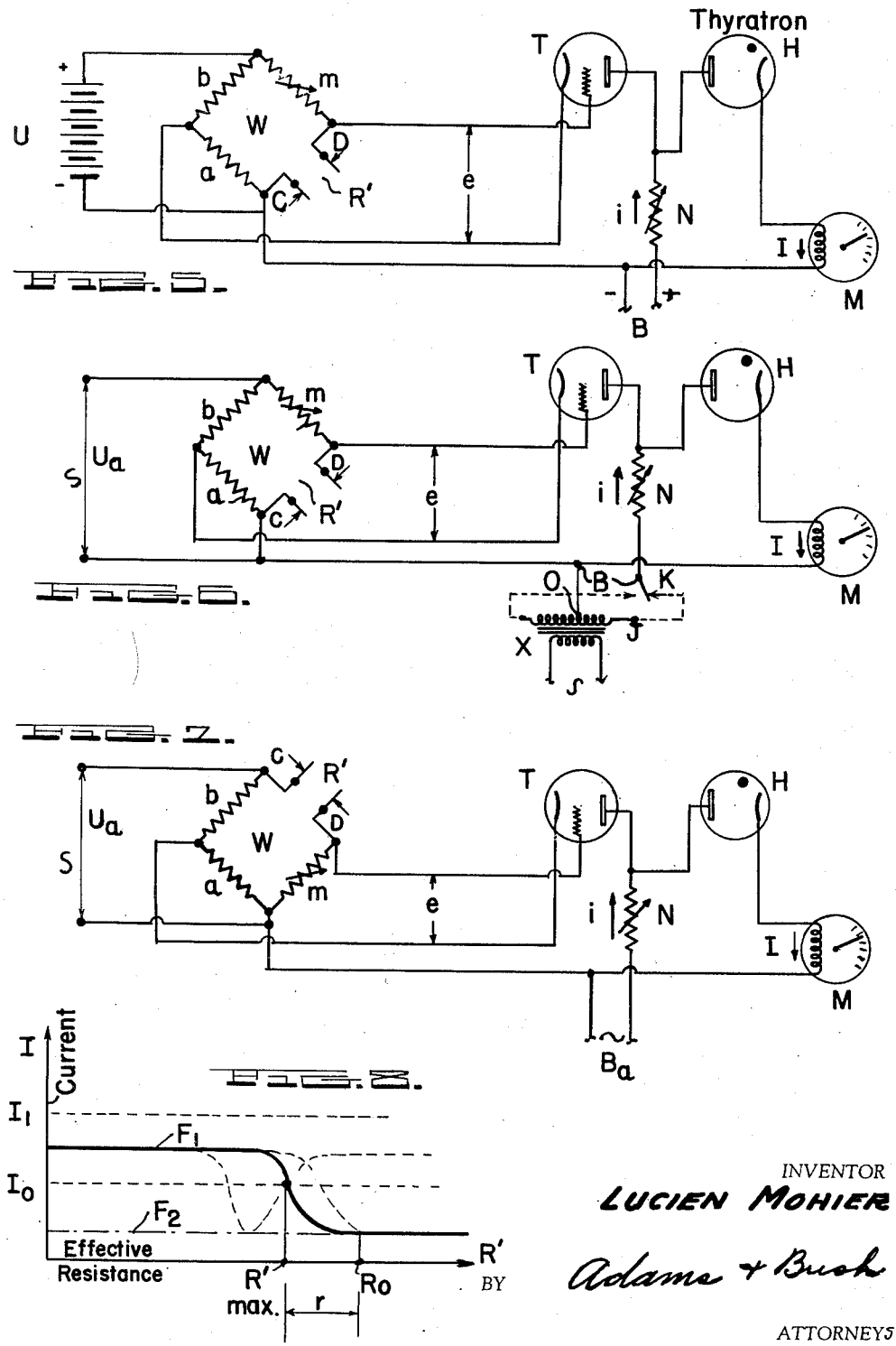

2,692,368

UNITED STATES PATENT OFFICE 2,692,368

CONTAINER FILLING INDICATOR AND INDICATING CIRCUIT THEREFOR

Lucien Mohier, Fontainebleau, France, assignor to Societe Preparation Industrielle des Combustibles, Fontainebleau, France, a French company Application August 26, 1949, Serial No. 112,528

Claims priority, application France September 1, 1948

5 Claims. (Cl. 324—65)

This application relates to a system for indicating the extent to which a silo or other container has been filled with a material such as coal, and, in particular, to electrical circuit arrangements for precisely indicating when a certain extent of filling has been attained.

A number of devices are known, for indicating or recording the degree of filling of a coal hopper or silo, or more generally, of a container for containing a liquid or a broken solid material.

None of these devices, however, is applicable to all situations, and each case calls for a particular way of handling. Further, these devices all comprise elements which are to some extent movable and subject to wear and to being thrown out of adjustment. As to the particular system which consists in indicating the level by the interruption of a light beam incident on a photoelectric cell, it cannot be used when the material considered is dusty, since the dust may be thick enough during the operation of filling, to cause an interruption of the light beam at the wrong time, before the material has attained the desired depth.

The principal advantages of the present invention are that with one single device, an extremely wide range can be covered, so that the device is capable of being used in almost all cases met with in practice, and also, that there are no moving elements, and, therefore, no danger of the device getting seriously worn or thrown out of adjustment.

The present invention provides on the one hand a principal electrode which may assume the shape of one or more metal fingers, one or more conducting plates, or any other conducting arrangement, insulated from the body of the container or hopper if the latter is metal. If the hopper or container is not metal, the principal electrode may be insulated from a second electrode or bottom or ground electrode which is provided; this second electrode may be of the same type or a different type from the principal electrode and positioned within the container at a point spaced from the principal electrode, as at the bottom of the container.

This principal electrode may be attached rigidly on the inner wall of the container or hopper, but, preferably, may be suspended inside the hopper or container, at a height chosen for the level whose attainment is to be indicated, whether that level is a maximum or intermediate level. In case a second or ground electrode is used with a non-metallic container, the second electrode is located below the principal electrode.

To consider the principle of the present invention, between the principal electrode on the one hand and the body of the container or the ground electrode on the other hand, there exists an insulation resistance, in the absence of the coal or other material with which the container or hopper is supposed to be filled, whose value may be designated $R_0$.

When the filling material has risen to attain the level of the principal electrode, there is presented, in parallel with the empty resistance $R_0$, a second resistance corresponding to the conducting path through the filling material lying between the principal electrode and the ground electrode, this second resistance is designated $R$.

Generally speaking, this second resistance of the path through the filling material, may have any value from nearly zero to a high value, according to the particular nature of the material contained in the hopper, and according to its moisture content, in the case of a broken solid material such as coal, ore, or the like. The largest possible value of this second resistance $R$ through the filling material between the electrodes, will be designated by $R_p$.

The equivalent resistance $R'$ of the parallel connection of the empty resistance $R_0$ and the material path $R$ is given by $$\frac{1}{R'}=\frac{1}{R_0}+\frac{1}{R} \qquad (1)$$

The maximum value of this equivalent resistance of the two in parallel, for $R=R_p$ is given by $$\frac{1}{R'_{max}}=\frac{1}{R_0}+\frac{1}{R_p} \qquad (2)$$

The present invention also provides on the other hand a device, capable of giving rise to an output electric current whose numerical value $I$, while not rigorously constant, lies between upper and lower limits sufficiently close to allow of its being used for energizing a relay or any other suitable output current responsive device, without damaging it, and this whatever may be the value of the resistance of the material between the electrodes, between the values zero and $R_p$, and especially for the insulation empty resistance $R_0$, the value of the electric current flowing is zero or definitely insufficient for operating this relay or current responsive device.

In the drawings:

Fig. 1 shows a silo for containing coal, provided with electrodes for contacting the coal when it has reached a certain depth, and an electrical circuit arrangement for indicating when that depth has been attained;

Fig. 1-a shows a modified manner of mounting the upper material-engaging electrode.

Fig. 2 shows a first form of circuit arrangement for use with the assembly of Fig. 1, using a D. C. supply;

Fig. 3 shows a typical curve representing the current flowing in the measuring circuit as a function of the effective resistance between the electrodes;

Fig. 4 is a voltage-current characteristic curve for the circuit arrangement of Fig. 2;

Fig. 5 is a modification of the circuit arrangement of Fig. 2, in which certain connections are interchanged, and using D. C. supply;

Fig. 6 shows a circuit generally similar to that of Fig. 2, but using two alternating current supplies in determined phase relation for the bridge and anodes;

Fig. 7 shows a circuit similar to that of Fig. 6, but using alternating current supplies which are in phase; and two bridge arms interchanged, and Fig. 8 shows for the arrangements of Figs. 5, 6 and 7, typical curves representing the current flowing in the measuring circuit as a function of the effective resistance between the electrodes.

Referring to the drawings, in Fig. 1, 1 is a container such as a silo for containing coal or the like, and 2 is a base therefor. The silo 1 is preferably made of some suitable insulating material, such as tile or concrete, but may be of metal. A metallic ground plate 3 on the base constitutes the ground electrode, which is in contact with the portion of the coal or broken material at the bottom of the silo. The upper electrode 4 is preferably mounted within the interior of silo 1, at the height whose attainment it is desired to indicate, and may have a grid of transverse straight pieces or fingers 8, carried on a transverse rod 7. Other forms of structure may be used for electrode 4. The transverse rod 7 is carried in insulators 5, 5, held in brackets 6, 6, attached exteriorly to the outer wall of silo 1. It is also possible to attach electrode 4 to the inner wall of silo 1 at the proper height.

The electrodes 3, 4 of the silo are connected to the input measuring terminals C, D, of a measuring or indicating system comprising a bridge W and a threshold input responsive unit 9 and an indicating instrument M, which may be a relay.

In Fig. 3, $I_0$ represents the minimum or threshold current value for operation of the relay or other current responsive device, for use with the maximum equivalent resistance $R'_{max}$, which maximum equivalent resistance itself is itself a function of the resistance $R_p$ as defined by Formula 2.

In Fig. 3, $I_1$ is the maximum allowable overload current above which injury to the measuring apparatus occurs.

$r$ is the safety margin which is predetermined between the value $R'_{max}$ and the empty insulation resistance $R_0$.

Replacing, in Formula 2, the resistance $R'_{max}$ by its value $$R'_{max} = R_0 - r \qquad (3)$$

there is obtained $$\frac{1}{R_0 - r} = \frac{1}{R_0} + \frac{1}{R_p} \qquad (4)$$

whence it follows $$R_p = \frac{R_0}{r}(R_0 - r) \qquad (5)$$

and, neglecting $r$ with respect to $R_0$ $$R_p = \frac{R_0^2}{r} \qquad (6)$$

Taking a margin of K per cent of the insulation empty resistance $R_0$, that is $$r = 0.01\,KR_0 \qquad (7)$$

there is obtained $$R_p = \frac{R_0^2}{0.01\,KR_0} \qquad (8)$$

or, to a good approximation $$R_p = \frac{100}{K}R_0 \qquad (9)$$

This last formula shows clearly the extent of the operating range of the device which is an object of the present invention, and whose characteristic is desired.

As an example, allowing a safety margin as low as K=3%, which is possible in some cases, and since it is very easy to obtain an insulation empty resistance whose value may reach from 1 to 10 megohms, the apparatus can easily indicate values of the second or material resistance R which lie between zero and 30 to 300 megohms. Such limits are sufficient to cover almost all cases met in practice, from very damp materials, which are good conductors, to dry stones and liquid materials which are often very poor conductors. The only factors which will vary from one case to another will be the area of the electrodes on the one hand and the insulation empty resistance on the other hand.

A wrong value of this empty insulation resistance may arise in the case that there remains, between the electrode and the ground, after emptying, a certain small amount of the material contents, and this especially when the contained material is viscous, semi-liquid or liquid. For this reason, the preferred embodiment, as previously described, provides for suspending the principal electrode inside the silo or hopper, or container, employing an outside insulating support, which is sufficiently far out of the reach of the contained material to insure good insulation.

Several different devices are capable of producing the measuring current I previously referred to, and the present invention is not limited to one single such device.

Figure 2 shows one such arrangement, wherein: W is a Wheatstone bridge, supplied with a constant energizing direct voltage from a source U, whose polarity and whose bridge diagonal of application are as shown in Fig. 2, consisting in its respective arms, of two fixed resistances $a$ and $b$, a variable resistance $m$, and a fourth test resistance whose nature will be later described, which is connected across the terminals C, D.

T is an electronic tube of the triode or pentode type, with suitable characteristics, which may function as an amplifier.

H is a type of gas filled tube shown as a diode which has a threshold voltage operating characteristic.

M is a current responsive device or relay as previously described.

Fig. 4 taken with Fig. 3 shows the operating characteristics of the arrangement. R' is the equivalent resistance across terminals C, D, and I is the output current of gas tube H. When the bridge is balanced, the biasing voltage $e$ for the grid of triode T is zero (Fig. 4); arrangements are made for the corresponding value of the plate current $i$ of triode T to cause a voltage drop across resistance N (Fig. 2) which sufficiently decreases the biasing voltage of gas tube H for the output of the gas tube to be zero, or, at least, appreciably lower than the threshold value $I_0$ of Fig. 3 which is the minimum current required to operate instrument M. Consequently, the indicating device M remains unactuated.

If the resistance across terminals C, D, increases, the bias voltage $e$ on the grid of triode T becomes positive, and the above phenomena are maintained or even increased, according to the tube characteristics.

However, if this resistance across terminals C, D, decreases, the bias voltage $e$ on the grid of triode T becomes negative, the output current $i$ of tube T decreases as well as the voltage drop across resistance N, and, for a certain value of this resistance across terminals C, D, giving the values $e_0$ and $i_0$ of Fig. 4 for the input voltage and output current of triode T, a sufficient biasing voltage on gas tube H due to voltage drop across resistance N is reached for giving an output of gas tube H equal to the threshold current value $I_0$ of Fig. 3 which is the minimum output current of gas tube H required to operate instrument M, hence the measuring or indicating instrument M operates:

When this resistance across terminals C, D, is zero (short circuit between the principal electrode and ground), the bias voltage $e$ applied to the grid of triode T is sufficiently negative for the output current $i$ of triode T to be zero, with the result that the output current I of gas tube H is maximum, but, due to the saturation of this tube, this maximum output current is still lower than the limiting safe value $I_1$ of Fig. 3.

The foregoing description of Fig. 2 has assumed any resistance, of any value whatever, to be connected across the terminals C, D.

The terminals C, D, may be connected, respectively, to the principal electrode 4 and ground electrode 3 of Fig. 1.

If the container is empty and if there is no material between electrodes 3 and 4, the existing resistance between terminals C and D will be the empty insulation resistance $R_0$.

If the variable resistance $m$ is given such a value that the balance of the bridge corresponds to a resistance lower than the value $R_0$, since it has been seen that the operating threshold of instrument M is obtained for a value of resistance which is itself lower than the balance resistance, it will be certain that between this threshold value of resistance and the empty value $R_0$, there exists the safety margin $r$ defined above.

In fact, this threshold resistance is precisely the resistance $R'_{max}$ which has been defined by Formula 2.

Hence, with the safety condition given by Formula 7, it may be shown from Formula 9 that the device described operates under the conditions initially described.

The arrangement which has been described is capable of indicating that the resistance across the electrodes lies within a range which is very wide, and, hence, can indicate the attainment of the height of the principal electrode by a filling of materials of many different kinds, and of substantially all the materials that are likely to be met in practice. The vertically elongated electrode of Fig. 1-a may be used to indicate the depth of filling.

The modifications shown in Figs. 5, 6 and 7, make it possible to improve the characteristic of the curve giving the various values which are taken by the current I which passes through the instrument M, as a function of the electrical resistance offered by the material in the silo or hopper, or container.

This characteristic consists, on the one hand, in a strict constancy of the measuring current I through the instrument, whatever may be the value of the resistance of the material to be observed for values of equivalent resistance $R'$ smaller than $R'_{max}$ substantially up to $R'_{max}$, and, on the other hand, in an abrupt variation of this current I for a resistance value of $R'_{max}$ determined experimentally and corresponding to the highest possible value of the resistance offered by the material, assumed to have a widely varying range of properties, and finally, in a constancy of the instrument current I at a value markedly different from the above for any value of equivalent resistance $R'$ larger than the specified value $R'_{max}$, especially for the insulation empty resistance $R_0$, this latter constancy of the current I allowing the indicating instrument M to remain in the same condition that it is in, in the absence of any material in the container, even if the insulation empty resistance $R_0$ happens to vary somewhat around its initial value.

All of these modifications are covered by Formula 9 given above:

$$R_p = \frac{100 R_0}{K}$$

where $R_p$ is the largest possible value of the resistance R and K is the safety factor, and this shows the range of operativeness of the device.

Finally, each of these modifications allows an adaptation to each case of observation, owing to the range of possible values of the threshold resistance $R'_{max}$.

Fig. 8 shows curves, drawn to an arbitrary scale, of the measuring current I as a function of the equivalent resistance $R'$, which is itself a function of the resistance of the path through the material itself.

The curve $F_1$ refers to the first and second modifications of Figs. 5 and 6, curve $F_2$ refers to the third and fourth modifications of Figs. 6 and 7, and each one of these curves $F_1$ and $F_2$ has the quality specified above.

The circuit of the first modification, as shown in Fig. 5, differs from the circuit of Fig. 2, by an interchanging of the terminals of the constant direct voltage source U applied across one of the diagonals of the bridge W, and by the interchanging of the grid and cathode connections of tube T. Making these two changes at the same time, does not cause any fundamental change in the operation of the device, but substantially improves its operation.

According to the value of the effective resistance $R'$, the bias voltage $e$ of the grid of tube T assumes a well defined value which depends not only on the value of equivalent resistance $R'$ as compared with the other bridge resistances, but, also on the voltage drop caused by the flow of plate current $i$ of the triode T, through arm $a$; this current $i$ itself depends not only on the value of the bias voltage $e$, but also on the voltage drop that it causes by flowing through resistance N, this voltage drop decreasing the constant direct voltage B.

There is thus established a law for the variation of the plate current $i$ of triode T as a function of the equivalent resistance $R'$, whose representation comprises already a portion which is sufficiently straight between the resistance value zero and the value R'max, with a marked variation above this value.

The result is that the voltage applied to the plate of the gaseous tube H, which voltage is the difference between the plate voltage supply B and the voltage drop caused by the flowing of the plate current $i$ of triode T through resistance N, follows a law having similar characteristics.

The same condition holds for the instrument current I, but, in this case, its variation curve is more pronounced between the points which define it, owing to the fact that the gaseous tube H has a threshold; that is, only a very small current flows through it as long as the voltage across its plate and cathode does not reach a certain determined value.

Further, this instrument current I causes, by its own action, a voltage drop by flowing through the resistance N, and also by flowing through the resistance which is inherent in the instrument or relay M.

The combined action of all of these factors, all of them suitably selected, yields an overall characteristic such as the curve $F_1$ of Fig. 8.

What constitutes a desirable shape for this overall characteristic may be found by calculation, by considering the elementary characteristic curves of the tubes used.

The second modification comprises the same elements and the same connections as the first modification, as shown in Fig. 5, and above described, but the high voltage supply B, and the bridge supply voltage U, are provided with alternating current both of the same frequency, instead of with direct current.

If these two sources of alternating voltage are in phase, the same operation is obtained as with the first modification. Such phase agreement may be obtained by taking off the high voltage from the points O and J on the secondary transformer X of Fig. 6.

The third modification is obtained by, in this case, taking off the high voltage from points O, A, of the transformer X, and, in this case, the voltages B and U are in phase opposition.

The operation of this third modification is then characterized by curve $F_2$ of Fig. 8.

The fourth modification is derived from the second modification, in which the B and U voltages are in phase, by interchanging the two arms $m$ and R' (CD) of the bridge W. This fourth modification is also characterized by curve $F_2$ of Fig. 8.

It is apparent that other modifications are possible, such, for instance, as supplying the device of the fourth modification with direct current instead of alternating current. It may also be arranged to determine the potential of the point common to the two arms $a$ and $b$ of the bridge W, by connecting this point with the body of the instrument, the negative terminal of the high voltage B being disconnected from the negative terminal of voltage source U and also connected to ground.

The system of my invention is capable of giving dependable indications that the value of the observed resistance lies within the determined range and that the material in the container has attained a certain depth.

It will be apparent to those skilled in the art that the system of my invention is susceptible of modifications to adapt the same to particular conditions, and all such modifications which are within the scope of the appended claims I consider to be comprehended within the spirit of my invention.

What is claimed is:

1. In an automatic level indicating vertical container system for storing coal and the like, a base, a vertical wall erected on said base, a base electrode mounted adjacent said base, an upper electrode, mounting means for mounting said upper electrode in the upper part of said container and comprising a support, said vertical wall being apertured to receive said support and being externally provided with electrical insulating means for engaging said support, and threshold operative electrical resistance measuring means connected to said electrodes and adapted to measure the electrical resistance therebetween, said threshold operative measuring means comprising a Wheatstone bridge having three resistance arms and a test arm, said test arm being connected across said electrodes, electronic tube threshold operating voltage responsive means having its input connected across opposite output corners of said bridge, and a voltage responsive electrical measuring instrument having its input connected to the output of said electronic means, said electronic tube means comprising direct current anode supply, and a direct current source connected to the two opposite corners of said bridge other than said two opposite output corners thereof.

2. In a system for indicating whether the value of an observed electrical resistance lies within a determined relatively wide range, a Wheatstone bridge having three resistance arms and a test arm, a triode having its input connected across opposite output corners of said bridge, a gas filled voltage responsive threshold operating tube having an anode and a cathode, resistance coupling means in the output load circuit of said triode coupling the output of said triode to the control input of said gas tube, and a voltage responsive electrical indicating instrument having its input connected to the output of said gas tube, one of said resistance arms which is adjacent to said test arm and has a common terminal therewith being a variable resistance, and the corner of said bridge intermediate said variable resistance and said test arm, and being the common terminal thereof, taken with the corner opposite thereto, constituting said output corners which are connected to the input of said triode, and a first direct current anode supply connected for energizing the anodes of both said triode and said gas tube, and a second direct current source connected to the two opposite corners of said bridge other than said two opposite output corners thereof, the positive terminal of said first supply being connected to a first terminal of said resistance coupling means, and the second terminal of said resistance coupling means being connected to the anode of said gas filled tube, whereby said gas tube becomes conductive only when said triode is biased to its low conducting condition.

3. A system according to claim 2, the common terminal of said variable resistance and said test arm being connected to the cathode of said triode, and the grid of said triode being connected to the corner of said bridge opposite said common terminal, and the positive pole of said second source being connected to the end of said test arm remote from said common terminal, and the negative pole of said second source being connected to the corner of said bridge opposite to the corner thereof to which the positive pole thereof is connected.

4. A system according to claim 2, the common terminal of said variable resistance and said test arm being connected to the grid of said triode and the cathode of said triode being connected to the corner of said bridge opposite said common terminal, and the negative pole of said second source being connected to the end of said test arm remote from said common terminal, and the positive pole of said second source being connected to the corner of said bridge opposite to the corner thereof to which the negative pole thereof is connected.

5. A system according to claim 4, said tubes and said resistances and said instrument being so constructed and arranged that the curve showing output current through said instrument plotted against the effective resistance constituting said test arm is a substantially horizontal straight line up to a value of said effective resistance somewhat below a determined value $R'_{max'}$ then descends with finite slopes to a relatively much lower current value for a value of said effective resistance somewhat greater than said determined value $R'_{max'}$ and thereafter is a substantially horizontal straight line extending to the right for increasing values of said effective resistance.

References Cited in the file of this patent

UNITED STATES PATENTS

| Number | Name | Date |
|---|---|---|
| 1,199,340 | Bloch | Sept. 26, 1916 |
| 1,504,978 | Robbins | Aug. 12, 1924 |
| 1,831,898 | Wignall | Nov. 17, 1931 |
| 1,960,350 | Shackleton et al. | May 29, 1934 |
| 2,086,965 | Shepard | July 13, 1937 |
| 2,215,805 | Wills | Sept. 24, 1940 |
| 2,229,036 | Bird et al. | Jan. 21, 1941 |
| 2,230,137 | Ewertz | Jan. 28, 1941 |
| 2,377,363 | Noble et al. | June 5, 1945 |
| 2,379,106 | Sanders | June 26, 1945 |
| 2,432,390 | Darby | Dec. 9, 1947 |
| 2,470,510 | Matson et al. | May 17, 1949 |